(12) United States Patent
Mehringer

(10) Patent No.: US 9,641,097 B2
(45) Date of Patent: May 2, 2017

(54) MOTOR VEHICLE ELECTRICAL SYSTEM HAVING AN ACTIVE BRIDGE RECTIFIER AND OVERVOLTAGE PROTECTION DURING A LOAD DUMP, RECTIFIER SYSTEM, ASSOCIATED OPERATING METHOD AND MEANS FOR ITS IMPLEMENTATION

(71) Applicant: Robert Bosch GmbH, Stuttgart (DE)

(72) Inventor: Paul Mehringer, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/278,544

(22) Filed: May 15, 2014

(65) Prior Publication Data
US 2014/0362625 A1   Dec. 11, 2014

(30) Foreign Application Priority Data

May 15, 2013   (DE) .................. 10 2013 208 968

(51) Int. Cl.
| | | |
|---|---|---|
| H02P 9/00 | (2006.01) | |
| H02P 11/00 | (2006.01) | |
| H02H 7/06 | (2006.01) | |
| H02M 7/219 | (2006.01) | |
| H02M 7/217 | (2006.01) | |
| H02M 1/32 | (2007.01) | |
| H02H 7/125 | (2006.01) | |
| H02P 1/30 | (2006.01) | |
| H02P 1/52 | (2006.01) | |

(52) U.S. Cl.
CPC .......... *H02M 7/219* (2013.01); *H02H 7/1252* (2013.01); *H02M 1/32* (2013.01); *H02M 7/2173* (2013.01); *H02M 2007/2195* (2013.01)

(58) Field of Classification Search
USPC .................. 322/18, 24, 28, 44, 29; 318/503
See application file for complete search history.

(56) References Cited

U.S. PATENT DOCUMENTS

| | | | | |
|---|---|---|---|---|
| 5,053,635 A | * | 10/1991 | West .......................... | H02J 9/06 |
| | | | | 307/46 |
| 5,629,606 A | * | 5/1997 | Asada .............................. | 322/28 |
| 5,663,631 A | * | 9/1997 | Kajiura et al. ................... | 322/29 |
| 6,239,582 B1 | * | 5/2001 | Buzan et al. .................... | 322/20 |

(Continued)

FOREIGN PATENT DOCUMENTS

| | | |
|---|---|---|
| DE | 43 00 100 | 7/1993 |
| DE | 19835316 | 2/2000 |

(Continued)

*Primary Examiner* — Pedro J Cuevas
(74) *Attorney, Agent, or Firm* — Gerard Messina

(57) ABSTRACT

A vehicle electrical system includes: an active bridge rectifier which is connected to a generator via multiple phase terminals, and having terminals on the direct voltage side; a unit for recognizing load shedding at the active bridge rectifier and short-circuiting the phase terminals in a clocked manner, as the result of which a pulsed current is fed to the vehicle electrical system; a vehicle electrical system capacitor configured for smoothing the pulsed current; and a voltage limiting unit configured for clipping a voltage between the terminals of the bridge rectifier on the direct voltage side to a predefined maximum voltage.

17 Claims, 6 Drawing Sheets

(56) References Cited

U.S. PATENT DOCUMENTS

| | | | | |
|---|---|---|---|---|
| 6,252,381 | B1* | 6/2001 | Schenk | F02N 11/04 322/20 |
| 6,353,307 | B1* | 3/2002 | Koelle | H02H 7/067 322/37 |
| 6,803,748 | B2* | 10/2004 | Peter | H02H 7/067 322/17 |
| 6,972,972 | B2* | 12/2005 | Duncan | H02M 7/003 363/131 |
| 7,629,776 | B2 | 12/2009 | Chemin et al. | |
| 8,008,895 | B2* | 8/2011 | Joho | H02P 9/30 322/28 |
| 8,896,275 | B2* | 11/2014 | Horihata et al. | 322/28 |
| 9,203,337 | B2* | 12/2015 | Magini | H02M 1/15 |
| 9,285,400 | B2* | 3/2016 | Mehringer | G01R 31/343 |
| 9,312,802 | B2* | 4/2016 | Magini | H02P 25/22 |
| 2002/0171401 | A1 | 11/2002 | Naidu et al. | |
| 2004/0024937 | A1* | 2/2004 | Duncan | H02M 7/003 710/100 |
| 2004/0150376 | A1* | 8/2004 | Peter | H02H 7/067 322/29 |
| 2005/0046397 | A1 | 3/2005 | Peter | |
| 2011/0075460 | A1* | 3/2011 | Sells | 363/127 |
| 2012/0001598 | A1* | 1/2012 | Horihata et al. | 322/21 |
| 2012/0007568 | A1* | 1/2012 | Horihata et al. | 322/21 |
| 2012/0091973 | A1* | 4/2012 | Horihata | 322/29 |
| 2012/0281446 | A1* | 11/2012 | Magini | H02J 7/1461 363/64 |
| 2014/0191698 | A1* | 7/2014 | Magini | H02P 27/06 318/503 |
| 2014/0204972 | A1* | 7/2014 | Mehringer | G01R 31/343 374/45 |
| 2014/0217948 | A1* | 8/2014 | Magini | H02M 1/15 318/503 |
| 2014/0232305 | A1* | 8/2014 | Magini | H02P 25/22 318/400.2 |
| 2016/0144724 | A1* | 5/2016 | Otte | H02M 1/32 307/10.1 |
| 2016/0211740 | A1* | 7/2016 | Schueler | H02P 25/22 |
| 2016/0257206 | A1* | 9/2016 | Otte | H02H 7/067 |
| 2016/0294181 | A1* | 10/2016 | Otte | H02H 7/067 |
| 2016/0329827 | A1* | 11/2016 | Otte | H03K 17/22 |

FOREIGN PATENT DOCUMENTS

| | | |
|---|---|---|
| DE | 10 2004 041 511 | 3/2006 |
| DE | 10 2006 047 243 | 11/2007 |
| DE | 60 2004 004 669 | 11/2007 |
| DE | 10 2006 032 736 | 1/2008 |
| DE | 102009046955 | 5/2011 |
| DE | 10 2011 002 674 | 8/2011 |

* cited by examiner

MOTOR VEHICLE ELECTRICAL SYSTEM HAVING AN ACTIVE BRIDGE RECTIFIER AND OVERVOLTAGE PROTECTION DURING A LOAD DUMP, RECTIFIER SYSTEM, ASSOCIATED OPERATING METHOD AND MEANS FOR ITS IMPLEMENTATION

BACKGROUND OF THE INVENTION

1. Field of the Invention

The present invention relates to a vehicle electrical system including an active bridge rectifier and means for protection from overvoltages during load shedding (dumping), and an associated operating method and means for implementing this operating method.

2. Description of the Related Art

Rectifiers of various designs may be used for feeding direct current systems out of three-phase current systems. The present patent application relates to active (controlled) bridge rectifiers which have active switching elements, for example in the form of known MOS field effect transistors. Bridge rectifiers having a six-pulse design are frequently used in vehicle electrical systems, corresponding to the three-phase current generators which are usually installed there. However, the present invention is similarly suitable for bridge rectifiers having other numbers of phases, for example five-phase generators, and in other use scenarios.

As explained in published German patent application document DE 10 2009 046 955 A1, for example, the use of active bridge rectifiers in motor vehicles is desirable, among other reasons, due to the fact that they have lower power losses compared to passive (uncontrolled) bridge rectifiers.

However, load shedding is a critical fault in particular in active bridge rectifiers. Load shedding occurs when, for a highly excited generator and a correspondingly high delivered current, the load on the generator or the bridge rectifier connected thereto suddenly decreases, for example, by disconnecting consumers, and this is not intercepted by capacitively acting elements in the direct voltage network (for example, the battery in the vehicle electrical system).

In this regard, in the extreme case the generator or the bridge rectifier connected thereto may continue to deliver additional energy to the vehicle electrical system for a duration of up to approximately 300 ms to 500 ms. This energy must be converted (cleared) in the bridge rectifier in order to protect downstream electrical components from damage from overvoltage. In passive or uncontrolled bridge rectifiers, this protection is generally provided by the rectifier diodes themselves, since the lost energy may be converted into heat in the rectifier diodes. However, presently available active switching elements such as MOS field effect transistors would be destroyed due to the high power loss. Therefore, additional protective strategies are necessary.

During load shedding, the generator phases, for example, may be short-circuited, at least temporarily, by simultaneously controlling all switching elements of the upper or lower rectifier branch, as also provided in published German patent application document DE 198 35 316 A1 and discussed in cited published German patent application document DE 10 2009 046 955 A1, for example. An appropriate control signal may also be clocked in such a way that the voltage does not fall below a minimum voltage level and does not exceed a maximum voltage level.

However, multiple clocking of the control signal within a half-wave has the disadvantages, among others, that during the initiation and elimination of corresponding phase short circuits, rapid changes in current occur which, in combination with the line inductances that are present, may result in voltage dips or peaks. The latter in particular may damage components.

Therefore, there continues to be a need for improved protective strategies for active bridge rectifiers during load shedding.

BRIEF SUMMARY OF THE INVENTION

Against this background, the present invention provides a vehicle electrical system including an active bridge rectifier, and means for protection from overvoltages during load shedding, as well as an associated operating method and means for implementing this operating method.

One important aspect of the present invention is the utilization of vehicle electrical system capacitors as the energy store during a load shedding mode of an active bridge rectifier. As explained, such a load shedding mode may include conductively connecting the generator phases to one another by simultaneously controlling (and thus at the same time conductively connecting) all active switching elements of a rectifier branch in a clocked manner ("short circuiting"). Within the scope of the present patent application, appropriate time periods in which the active switching elements of a rectifier branch are simultaneously controlled, and thus conductively connected (thus establishing a short circuit of the generator phases), are referred to as "short circuit phases." In the terminology of the present patent application, these types of short circuit phases are "initiated" and "eliminated." This takes place by controlling the active switching elements. In the present context, a "clocked" short circuit refers to a conductive connection which is established and disconnected in alternation corresponding to a certain frequency or to a certain control pattern, it being possible to set or predefine, for example, the duration of the short circuit phases. This is explained in greater detail below in conjunction with FIGS. 1A through 1C.

As is generally known, an active bridge rectifier has half bridges which with their respective active switching elements define an "upper" or "high-side" and a "lower" or "low-side" rectifier branch. With the aid of the active switching elements situated in the upper or high-side rectifier branch, in each case a connection of one or multiple terminals on the alternating voltage side to a positive terminal on the direct voltage side may be established, and with the aid of the active switching elements situated in the lower or low-side rectifier branch, a connection of one or multiple terminals on the alternating voltage side to a negative terminal on the direct voltage side may be established. With the aid of the terminals "on the alternating voltage side," the active bridge rectifier is connected to an appropriate number of generator phases, and the terminals "on the direct voltage side" supply a direct voltage vehicle electrical system. The negative terminal on the direct voltage side may in particular be connected to ground. If two of the active switching elements of a rectifier branch are thus simultaneously conductively connected, the appropriately connected generator phases are conductively connected to one another (short-circuited). If all (for example, all three) generator phases are conductively connected to one another, i.e., a corresponding short circuit phase is initiated, current is not able to flow into the direct voltage vehicle electrical system. The generator phases may also be short-circuited by additional switching elements (i.e., not the active switching elements of the rectifier branches). Such additional switching elements may be provided, for example, in shorting circuit 6 in FIG. 4 explained below. These switching elements may likewise be provided in the form of a bridge circuit, for example.

An appropriate rectifier operation includes, for example, recognition of load shedding by voltage evaluation at a terminal of the bridge rectifier (generally the positive terminal) on the direct voltage side. If load shedding is recognized, a load shedding mode is initiated which includes clocked short-circuiting of the generator phases. Thus, appropriate short circuits are initiated and eliminated in a clocked manner, it being possible to set or predefine the frequency and the duration of the individual phases.

If, for example, all active switching elements of the lower rectifier branch are controlled in a clocked manner, the generator having the connected bridge rectifier behaves as a pulsed current source. This is also illustrated below with reference to FIG. 2.

To be able to continue to maintain the voltage supply in the vehicle electrical system with the aid of a pulsed current source, an energy store in the form of a capacitor is necessary. Within the scope of the present patent application, this capacitor is referred to as the "vehicle electrical system capacitor." Within the scope of the present invention, the vehicle electrical system capacitor is connected to the bridge rectifier or to a terminal of the bridge rectifier on the direct voltage side via a line of a certain length. The overall system thus meets the function of a buck converter. During the short circuit phases, the vehicle electrical system is fed from the stored energy in the vehicle electrical system capacitor. If the short circuit is deactivated, the current which is fed to the vehicle electrical system by the bridge rectifier is divided into a portion which flows directly into the vehicle electrical system, and a portion which charges the vehicle electrical system capacitor (see FIG. 1B).

The line via which the vehicle electrical system capacitor is connected necessarily has a corresponding line inductance. In the event of a rapid voltage rise at a terminal of the bridge rectifier on the direct voltage side, this results in induction of a countervoltage which causes temporary voltage peaks. Typical values for appropriate cables include a length of 1.5 m, for example, with an inductance of 1.5 µH to 2.5 µH, for example. The voltage peaks which arise must be limited, since otherwise the switching elements of the bridge rectifier may be destroyed, and damage to the connected controllers and the control electronics system of the bridge rectifier may result.

The present invention therefore provides a reduction in such voltage peaks. This may take place, for example, using the measures explained in detail below. These measures include, among others, providing internal clamping elements (i.e., clamping elements which are integrated into the half bridges of the bridge rectifier), external clamping elements (i.e., clamping elements between the direct voltage terminals of the bridge rectifier), and the controlled utilization of the avalanche breakdown in the active switching elements of the bridge rectifier.

Internal clamping elements are illustrated in detail in FIG. 6. With the aid of these types of clamping elements, the gate of the active switching elements of the particular rectifier branch which is not short-circuited may be autonomously controlled above a breakdown voltage, for example. For this purpose, the positive terminal of the bridge rectifier on the direct voltage side is connected in each case to the gate terminals via a Zener diode which is integrated in a blocking manner, for example. Only when the voltage of the positive terminal of the bridge rectifier on the direct voltage side exceeds the blocking voltage of the Zener diode which corresponds to the desired breakdown voltage during a short circuit phase does a current flow to the gate terminals, thus also conductively connecting the active switching elements of the rectifier branch which previously was not short-circuited. These switching elements remain conductively connected until the voltage of the positive terminal of the bridge rectifier on the direct voltage side is below the blocking voltage of the Zener diode, and therefore current no longer flows to the particular gate terminals.

A Zener diode, for example, may be provided directly between the terminals on the direct voltage side as the external clamping element. An appropriate Zener diode is directly incorporated between the terminals on the direct voltage side, and may be integrated into the bridge rectifier, for example. Below its forward voltage, the Zener diode blocks a current flow from the positive terminal to the negative terminal. The Zener diode is preferably provided in the immediate proximity of the bridge rectifier so that it can completely prevent the voltage peaks caused by the line inductance. The Zener diode is selected in such a way that its breakdown voltage is below the maximum voltage of the voltage peaks and is in a tolerable range for the mentioned elements. An appropriate Zener diode thus effects clipping of the voltage, which between the terminals on the direct voltage side drops to the breakdown voltage. The voltage peaks may also be limited by using a varistor which is integrated between the terminals of the rectifier on the direct voltage side corresponding to the options explained above.

It may also be provided to make appropriate external clipping of the voltage available directly at the bridge rectifier by a controllable switching element between the terminals on the direct voltage side. An appropriate switching element may be controlled, for example, by a control device which is also used for controlling the rectifier. For this purpose, a voltage evaluation may be carried out; however, it may also be provided to establish a connection, which in particular is clocked, for a predetermined time period (several milliseconds, for example) between the terminals on the direct voltage side whenever a short circuit is eliminated by the control device. The duration of control or clocking may be predefined based on a measurement and/or modeling of the voltage peaks which occur or which are to be expected.

As mentioned, the clipping may also take place by making use of the avalanche breakdown in the active switching elements of the bridge rectifier, more precisely, in the active switching elements of the particular rectifier branch which is not short-circuited. As is known to those skilled in the art, an avalanche breakdown is understood to mean one of three types of breakdown in semiconductor components. The avalanche breakdown causes a steep rise in the current above a certain blocking voltage. The avalanche effect (also referred to as the avalanche multiplication or carrier multiplication) is the initiator of the avalanche breakdown. The avalanche effect is a reversible effect, provided that the permissible overall power loss of the component is not exceeded. For this purpose, the active switching elements of the particular rectifier branch which is not short-circuited have an avalanche-resistant design, and thus effect clipping without additional switching elements.

The described elements (Zener diodes, varistors, and controllable switching elements, which optionally may also have an avalanche-resistant design) are subsumed herein under the term "voltage-dependent elements." These types of voltage-dependent elements are characterized by a structural design and/or an appropriate control such that they go from a high-resistance state into a low-resistance state above a predefined voltage. This also applies for active switching elements which according to an appropriate control go from a nonconductive state into a conductive state.

The described elements (Zener diodes, varistors, and controllable switching elements) are preferably situated "directly" on the bridge rectifier, so that only the shortest possible line segment in which a countervoltage may build up due to a line inductance is present between the bridge rectifier and the corresponding element. As explained, a vehicle electrical system capacitor such as a known smoothing capacitor may be provided in the vehicle electrical system. The vehicle electrical system capacitor is connected to the bridge rectifier via a line having a length of m meters and/or a line inductance of m pH. In contrast, the line or the line segment via which these elements (Zener diodes, varistors, and controllable switching elements) which are "directly" situated on the bridge rectifier is connected, has a length of only n meters and/or a line inductance of m μH, where n has a maximum value of 0.5, 0.4, 0.3, 0.2, 0.1, 0.05, or 0.01 times m. The effects of the line inductances may be practically completely eliminated in this way.

In addition, wiring of the active switching elements of the bridge rectifier in the form of a clamping circuit may be advantageous for limiting the voltage peaks. This allows a reduction of voltage peaks without the need for providing additional elements. For example, the mentioned clamping circuit may be implemented in the upper rectifier branch, and the shorting circuit may be implemented in the lower rectifier branch.

An arithmetic unit according to the present invention, such as a control unit of a motor vehicle or a rectifier control system, is configured, in particular by programming, to carry out a method according to the present invention.

In addition, the implementation of the method in the form of software is advantageous, since this entails particularly low costs, in particular when an executing control unit may also be used for other tasks, and therefore is present anyway. Suitable data carriers for providing the computer program are in particular diskettes, hard drives, flash memories, EEPROMs, CD-ROMs, DVDs, and others. In addition, downloading a program via computer networks (Internet, intranet, etc.) is possible.

Further advantages and embodiments of the present invention result from the description and the appended drawings.

It is understood that the features mentioned above and to be explained below may be used not only in the particular stated combination, but also in other combinations or alone without departing from the scope of the present invention.

The present invention is schematically illustrated in the drawings based on one exemplary embodiment, and described in greater detail below with reference to the drawings.

DETAILED DESCRIPTION OF THE INVENTION

Figure 1A:
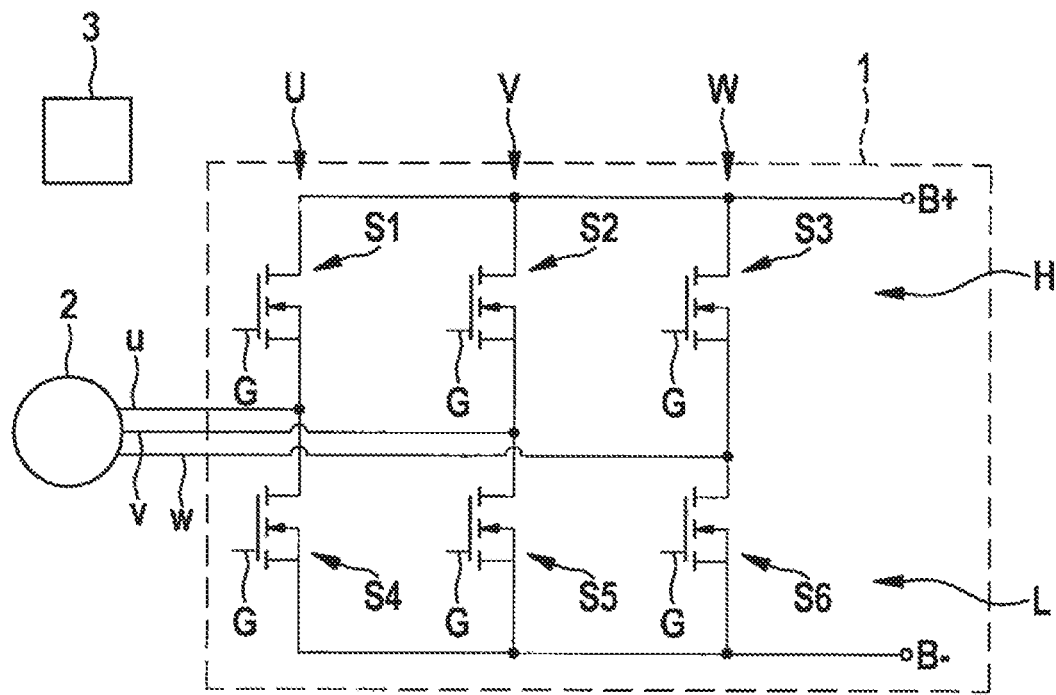
FIGS. 1A through 1C show systems including active bridge rectifiers and their function in a schematic illustration.

Identical or mutually corresponding elements are denoted by the same reference numerals in the figures, and a repeated description of these elements is dispensed with.

Figure 1B:
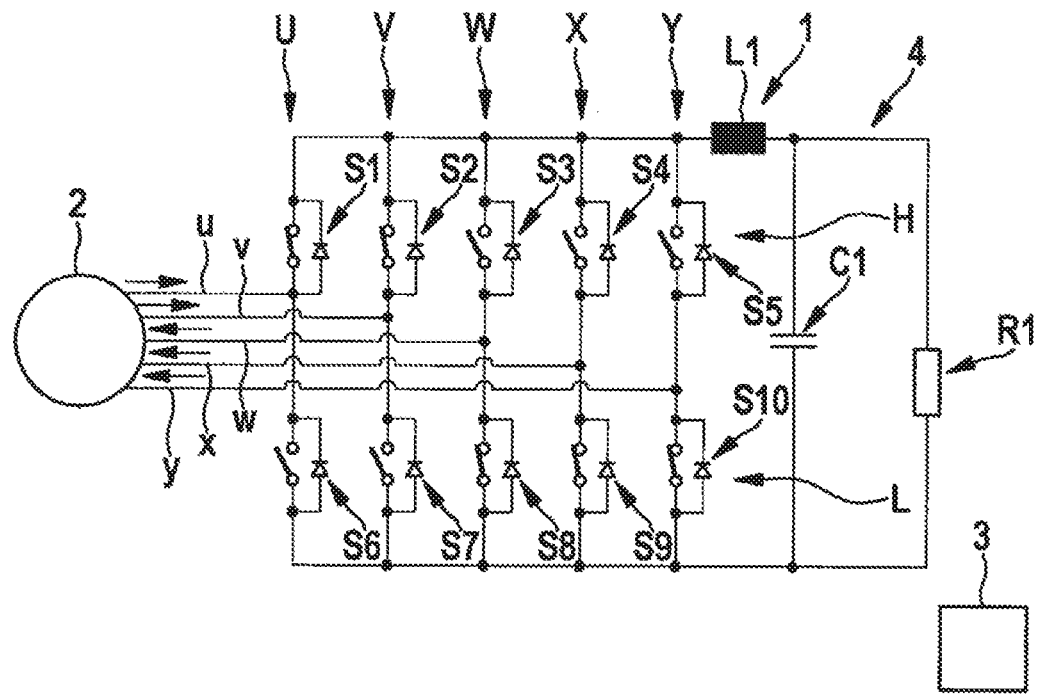
Figure 1C:
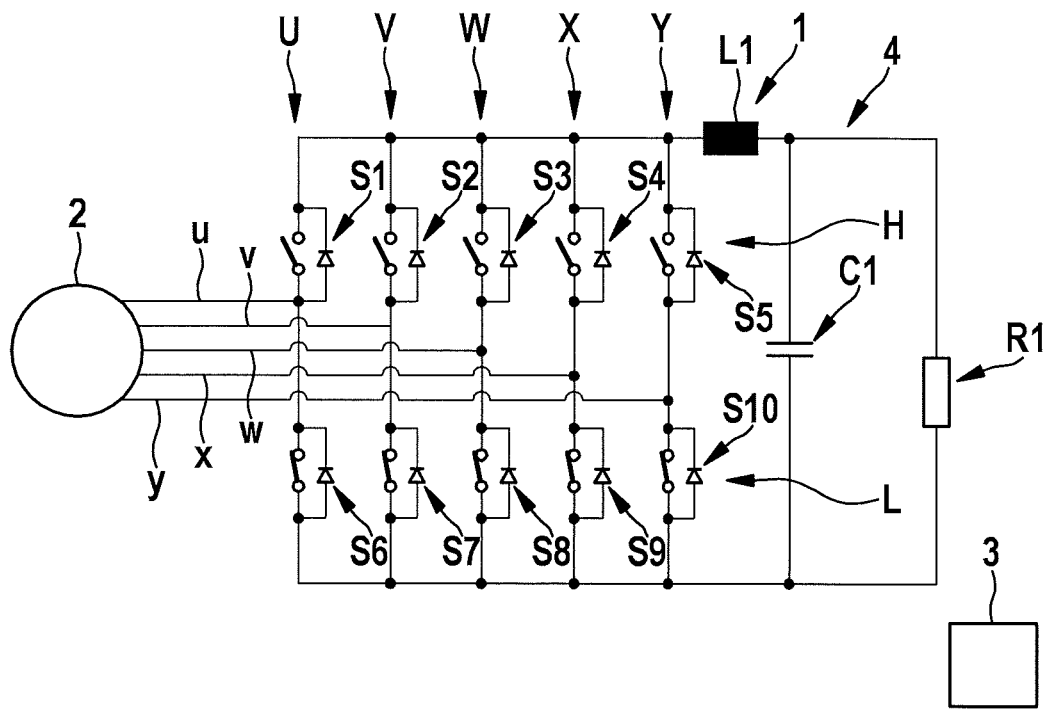

FIGS. 1A through 1C show systems including active bridge rectifiers and their function in a schematic illustration.

FIG. 1A schematically illustrates a conventional system including a bridge rectifier 1 and a generator 2, using the example of a three-phase system. Bridge rectifier 1 is illustrated in FIG. 1A as a six-pulse bridge rectifier which is configured for rectifying a three-phase current of a three-phase generator 2. However, a four-, five-, six-, or seven-phase generator 2 and a correspondingly adapted bridge rectifier 1 may similarly also be used. FIGS. 1B and 1C show examples of systems including a five-phase generator 2 and corresponding bridge rectifiers 1.

Bridge rectifier 1 has three half bridges U, V, and W which are connected to corresponding outputs of generator 2, and thus to the respective generator windings, via inputs u, v, and w, respectively.

Half bridges U, V, and W are connected on the output side to, for example, a positive battery terminal B+ and a negative battery terminal B− and/or corresponding supply lines B+ and B− of a direct voltage network. Terminal B− may be connected to ground. Half bridges U, V, and W have active switching elements S1 through S6 which are integrated into an upper branch H (high side) and a lower branch L (low side) of the particular half bridges U, V, and W.

An input u, v, and w may be connected to B+ and/or B− according to appropriate wiring of active switching elements S1 through S6, simultaneous control in each case of both switching elements of a half bridge U, V, and W (i.e., S1/S4, S2/S5, and S3/S6) being avoided in controlled operation in order to prevent "hot paths" between B+ and B−.

Active switching elements S may be acted on via their respective gate terminals G by a control signal, provided by a control device 3 via control lines, not illustrated, corresponding to a control pattern. The normal operation of the generator includes controlling of active switching elements S in such a way that a current signal which is present at a corresponding input u, v, and w of a generator winding of generator 2 which is thus connected thereto is alternatingly fed to B+ and B−. This normally takes place in such a way that when a positive half-wave is present at inputs u, v, and w, the particular signal is fed to B+, whereas when a negative half-wave is present, the signal is fed to B—. An output voltage at B+ may also be set by appropriate clocking.

In a system illustrated in FIG. 1A, load shedding may be detected based on a voltage which is present at B+. Load shedding may be recognized when a defined threshold value is exceeded.

When load shedding is recognized, rectifier 1 may be controlled in such a way that the phase windings of generator 2, which in each case are connected to the half bridges of rectifier 1 via one of inputs u, v, and w, are short-circuited in a temporally defined manner. As a result, the current which is fed to the vehicle electrical system drops to zero. A corresponding short circuit may be established by simultaneously controlling, and thus conductively connecting, S1 through S3 or S4 through S4 of a rectifier branch H or L, respectively. The current once again rises when the short circuit is eliminated. This sequence may be used for regulating the output voltage and/or for reducing an overvoltage of the generator. However, as mentioned, problems may arise as the result of current or voltage peaks due to line inductances. The voltage peaks produce high power losses in the half bridges which may result in thermal destruction.

FIGS. 1B and 1C each illustrate systems including a five-phase generator 2 and a rectifier 1 including five half bridges. The inputs are denoted by reference characters u through y, and the half bridges are correspondingly denoted by reference characters U through Y. Half bridges U through Y have active switching elements S1 through S10. Switching elements S1 through S10 are illustrated as switches including a diode connected in parallel, although in reality they are designed as MOS field effect transistors, for example, as shown in FIG. 1A. In other respects, the systems in FIGS. 2B and 2C correspond to those in FIG. 1A.

A vehicle electrical system capacitor C1 and a resistive load R1 are situated in a downstream vehicle electrical system 4. The resistive load corresponds, for example, to a consumer in vehicle electrical system 4. A line inductance L1 results from the lines in vehicle electrical system 4, as explained in greater detail below.

FIG. 1B illustrates a momentary state during normal operation of the system in question. It is assumed here that at this point in time, a current flows out of generator 2 into rectifier 1 at phases u and v, while a current flows into generator 2 at phases w, x, and y. Switching elements S1 and S2 establish a conductive connection of inputs u and v to positive output U+ on the direct voltage side as the result of appropriate control. Switching elements S8, S9, and S10 establish a conductive connection of inputs w, x, and y to negative output U− on the direct voltage side. At the moment in question, a positive voltage potential is present at inputs u and v, whereas a negative voltage potential is present at inputs w, x, and y. This results in a flow of current out of generator 2 into rectifier 1 via inputs u and v, as illustrated by corresponding arrows, whereas a current flows out of rectifier 1 into generator 2 via inputs w, x, and y. The current fed by the generator is too high during load shedding, and in this case is 150 A, for example.

Since a vehicle electrical system capacitor C1 is provided in the present case, a portion of the current, for example 130 A, flows into the vehicle electrical system capacitor and charges it. The remaining portion, in the present case 20 A, flows into actual vehicle electrical system 4, i.e., resistive load R1.

To avoid excessively high current flows during load shedding, a switching state may be periodically set, as shown in FIG. 1C. In this case, all switching elements S6 through S10 of lower rectifier branch L are conductively connected. Alternatively, it is also possible to establish the conductive connection via switches S1 through S5. Inputs u through y, and thus the corresponding generator phases, are thus conductively connected to one another (short-circuited). Current no longer flows out of generator 2 into rectifier 1. In this switching state, vehicle electrical system 4 is fed solely from vehicle electrical system capacitor C1. The switching state in FIG. 1C is set until a voltage between voltage terminals B+ and B− on the direct voltage side is once again below a permissible value. The switching state in FIG. 1B is then reset until the voltage between voltage terminals B+ and B− on the direct voltage side once again exceeds the permissible value, and so forth. As explained, voltage dips and peaks result during switching over between the switching states in FIGS. 1B and 1C.

Figure 2:
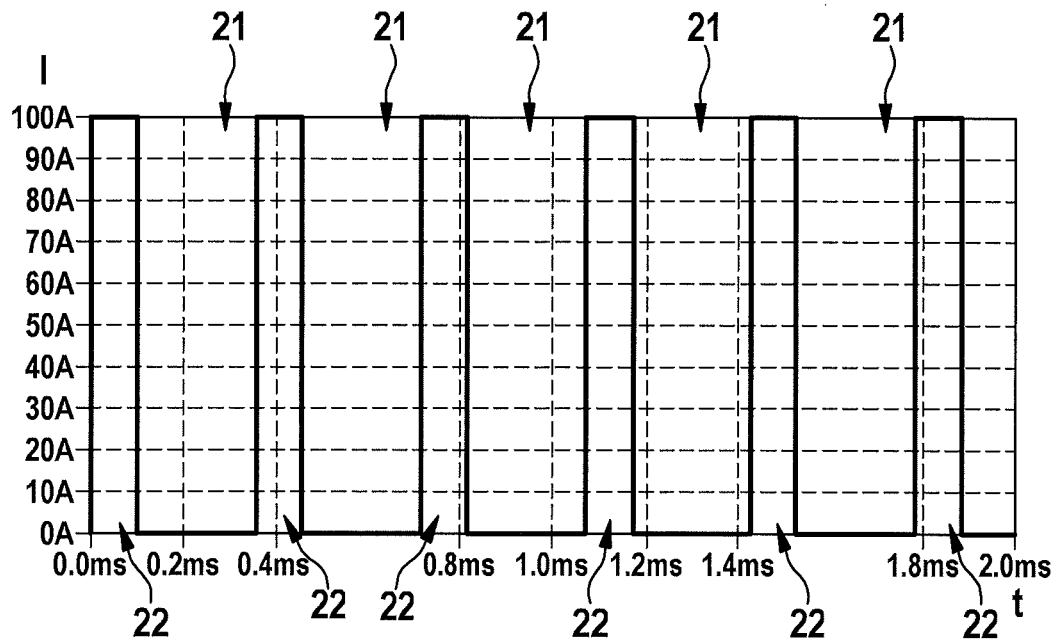
FIG. 2 shows a current pattern for control of an active bridge rectifier during load shedding.

FIG. 2 illustrates a generator current pattern in this type of control of an active bridge rectifier 1 during load shedding, according to the related art. In the illustrated diagram, generator current pattern i as current I in A is plotted on the y axis as a function of time t in ms, plotted on the x axis.

As previously explained in conjunction with FIG. 1A, within the scope of conventional control during load shedding, switching elements S1 through S3 and S4 through S6 (or switching elements S1 through S5 and S6 through S10 according to FIGS. 1B and 1C) of a rectifier branch H and L, respectively, are simultaneously controlled during certain time periods 21; i.e., the generator phases are short-circuited. Thus, no current is delivered to the vehicle electrical system. During time periods 22, the short circuit is eliminated and a current is delivered to the vehicle electrical system. As is apparent from FIG. 2, the current suddenly increases from 0 A to 100 A, for example, and correspondingly suddenly decreases. As explained, voltage peaks with corresponding negative effects may thus arise in conjunction with line inductances in the vehicle electrical system.

Figure 3:
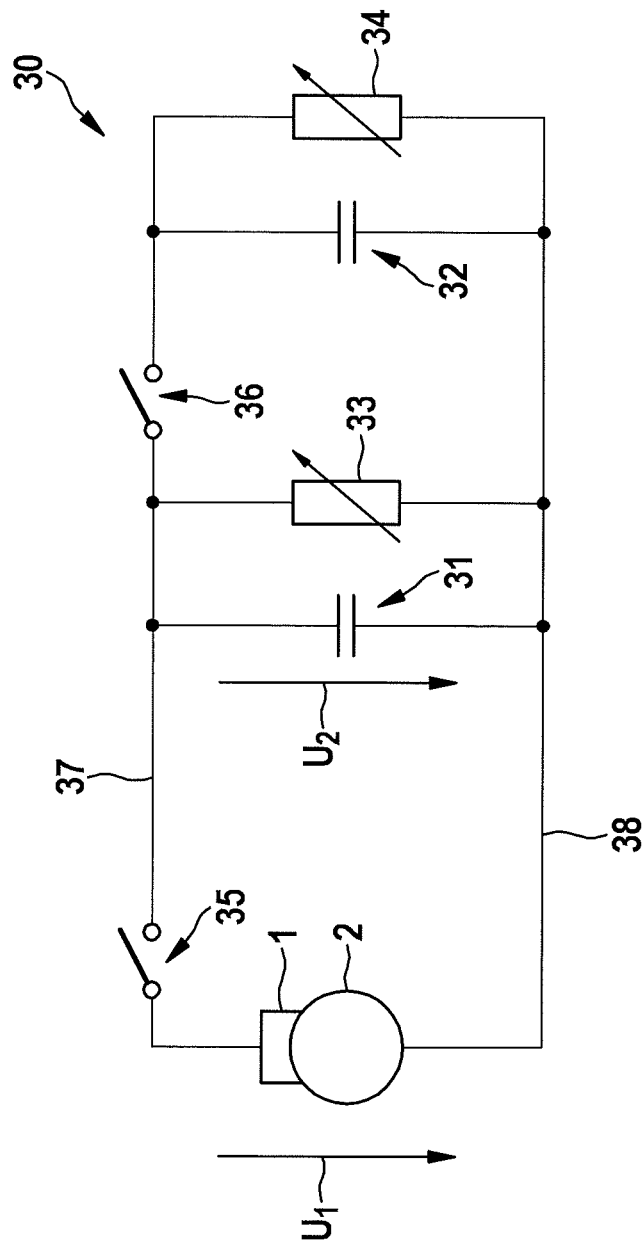
FIG. 3 shows a system for testing load shedding, which may be operated according to the present invention, in a schematic illustration.

FIG. 3 shows a schematic illustration of a system 30 for testing or simulating load shedding. System 30 includes a generator 2 including a bridge rectifier, as explained with reference to FIGS. 1A through 1C. A voltage U1 is present at the bridge rectifier.

Capacitors 31 and 32 and load resistors 33 and 34 of system 30 represent capacitors and resistors, respectively, of an actual vehicle electrical system. A voltage U2 drops at the actual vehicle electrical system. These capacitors and resistors are connected to generator 2 and bridge rectifier 1 via a line 37, and are connectable via switches 35 and 36. Line 37 simulates the inductance of the vehicle electrical system, resulting in a voltage difference between U1 and U2 in the event of load shedding.

At the start of a load shedding test, both switches 35 and 36 are closed. Generator 2 and bridge rectifier 1 deliver a current to the vehicle electrical system which results from voltage U2 and load resistors 33 and 34.

Load shedding may be simulated by opening one of switches 35 or 36. Opening switch 35 corresponds to a load drop to 0%, as would be caused in reality, for example, by the battery bolt or the connecting cable to the generator falling off. In contrast, opening switch 36 simulates a partial load drop, as is caused by disconnecting a fairly large resistive load in the vehicle electrical system. The magnitude of the "shed" load current may be set via the resistance value of load resistor 34, and the magnitude of the remaining current of the vehicle electrical system may be set via the resistance value of load resistor 33.

It is important to note that, due to the pulse-shaped delivery of current of generator 2 or of the downstream rectifier (see FIG. 2), an energy store, for example in the form of the mentioned vehicle electrical system capacitor, is necessary for continuously supplying voltage to the direct voltage network. This is always the case, for example, in customary direct voltage networks such as vehicle electrical systems. However, the interruption (elimination) of the described phase short circuits results in a voltage rise due to the line inductances, which is prevented according to the present invention.

The measures according to the present invention are further explained with reference to FIG. 4, which shows a system including a bridge rectifier 1 and a generator 2 corresponding to FIG. 1A. The system has a correspondingly designed control device 3. The important elements have already been explained with reference to FIG. 1A.

During load shedding mode, i.e., during clocked control in each case of all switching elements S1 through S3 and S4 through S6 of a half bridge H and L, respectively, a current which is fed to a vehicle electrical system via terminals B+ and B− of bridge rectifier 1 on the direct voltage side has a pattern as illustrated in FIG. 2. Vehicle electrical system capacitor C1 and resistive load R1 are situated in downstream vehicle electrical system 4. The resistive load corresponds, for example, to a consumer in vehicle electrical system 4.

A current or a voltage may be smoothed with the aid of vehicle electrical system capacitor C1. Vehicle electrical system capacitor C1 acts similarly to a buck converter, as previously described. No current is fed to vehicle electrical system 4 during the short circuit phases (time periods 21 in FIG. 2). Vehicle electrical system 4 is fed from the stored energy in vehicle electrical system capacitor C1 during time periods 21. In time periods 22 in FIG. 2, i.e., when a corresponding short circuit is deactivated, the fed currents are divided into partial currents which flow directly into vehicle electrical system 4, and partial currents which charge vehicle electrical system capacitor C1 (see FIG. 1B and associated descriptions). When the short circuits are deactivated, i.e., during the transition from time periods 21 to time periods 22 in FIG. 2, this results in a sudden rise in current at terminals B+ and B− of bridge rectifier 1 on the direct voltage side. This is due to the fact that a line segment having a certain length and therefore a certain line inductance L1 is present between terminal B+ of bridge rectifier 1 on the direct voltage side and, for example, a connecting point 41 in vehicle electrical system 4. A corresponding line segment may have, for example, a length of 1.5 m and an inductance of 1.5 µH to 2.5 µH.

Figure 6:
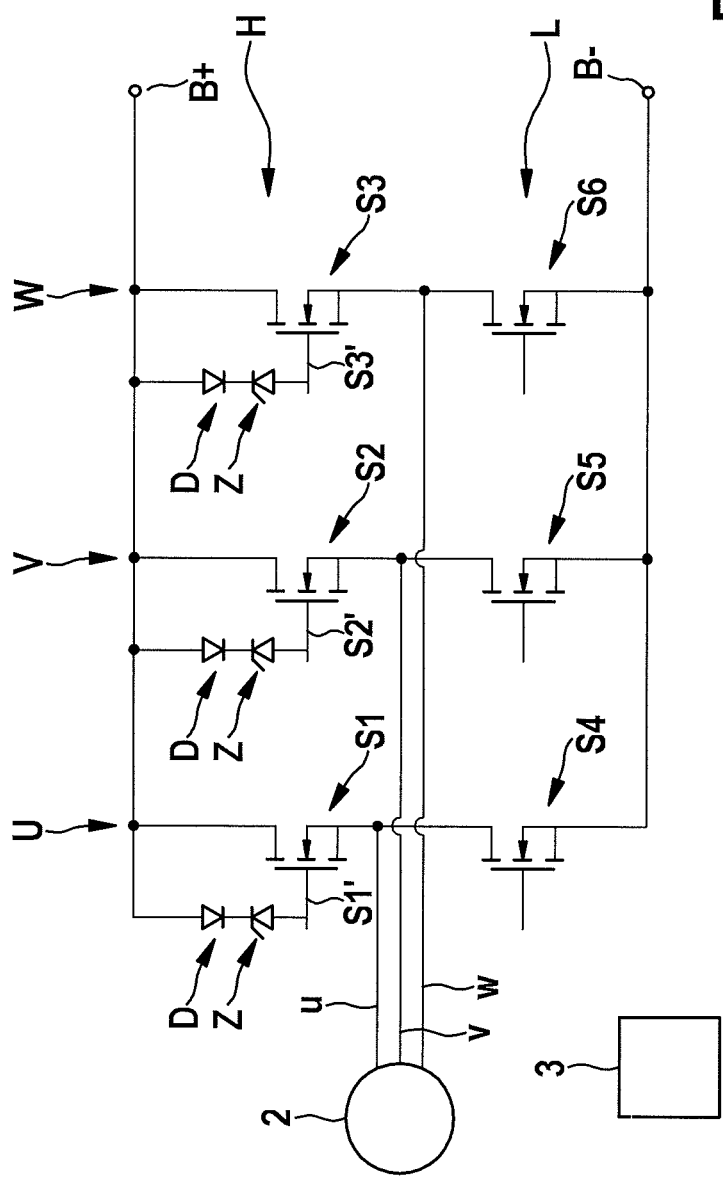
FIG. 6 shows a system including an active bridge rectifier, which may be operated according to the present invention, in a schematic illustration.

One option for preventing such voltage peaks is to provide a voltage-dependent element 5, which in the present case is designed as an external clamping element. In this context, a "voltage-dependent element" is understood to mean an element in which, above a certain voltage between terminals B+ and B− of bridge rectifier 1 on the direct voltage side, a transition occurs from a high-resistance state into a low-resistance state. For example, within the scope of the present invention, as mentioned, a Zener diode or a varistor may be used as voltage-dependent element 5. However, voltage-dependent element 5 may also be designed as a switching element which is suitably controlled, for example with the aid of control device 3, when a short circuit phase is deactivated. With regard to the other options, reference is made to the above explanations. In particular, the present invention may also be implemented without this type of external clamping element by using either internal clamping elements, as shown in FIG. 6, or active switching elements S1 through S6 having an avalanche-resistant design. In the latter case, switching elements S1 through S6 of the particular rectifier branch which is not short-circuited (generally upper rectifier branch H) reversibly go into a low-resistance state above the appropriate blocking voltage, as explained above.

Voltage-dependent element 5 is preferably selected or controlled in such a way that the voltage, above which element 5 goes into the low-resistance state (also referred to below as "clamping voltage"), is clearly above the normal voltage or control voltage. The clamping voltage at terminal B+ on the direct voltage side must be considerably above (typically up to 10 V) the short circuit activation for switching elements S1 through S6 that is used for the load shedding mode, but considerably below the breakdown voltage of switching elements S1 through S6.

Figure 4:
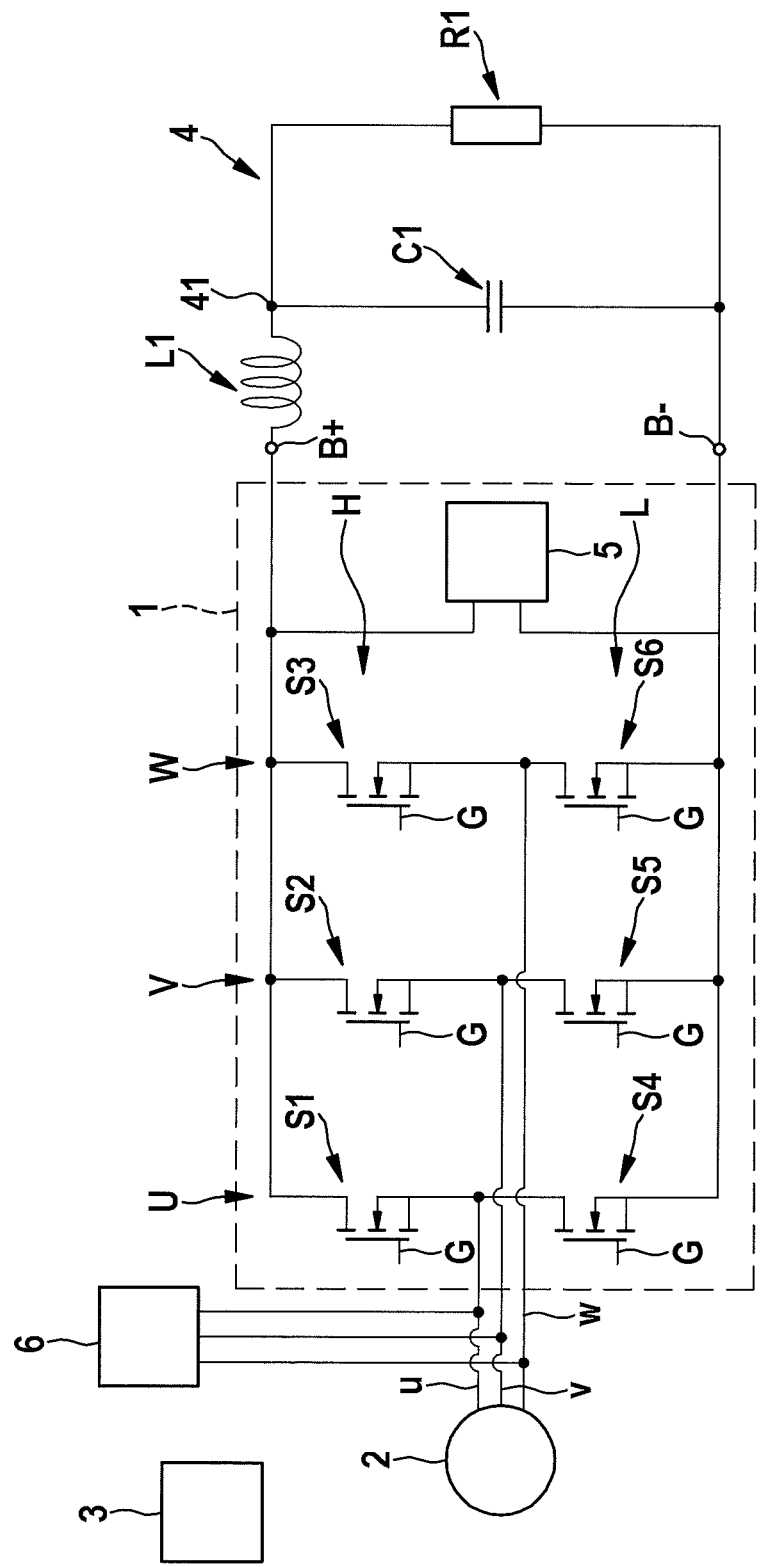
FIG. 4 shows a system including an active bridge rectifier, which may be operated according to the present invention, in a schematic illustration.

However, the present invention is not limited to the use of a voltage-dependent element 5 as illustrated in FIG. 4. It may also be provided to limit the voltage rise by suitable wiring of switching elements S1 through S3 of upper rectifier branch H in half bridges U, V, and W. If, for example, switching elements S4 through S6 of lower rectifier branch L are conductively connected for initiating the phase short circuit, when the phase short circuit is eliminated, appropriate clipping in a switching element S1 through S3 of the upper rectifier branch may temporarily take place after the short circuit at switching elements S4 through S6 of lower rectifier branch L has been eliminated. The converse similarly applies. Thus, for a short circuit in upper rectifier branch H, a switching element in lower rectifier branch L may be wired for the clipping.

A corresponding short circuit of the generator phases or of corresponding phase terminals u, v, and w may also be produced in a separate shorting circuit 6, it being possible for clipping to be carried out in lower rectifier branch L or upper rectifier branch H or in an external voltage protector, for example voltage-dependent element 5, such as a Zener diode or a varistor.

Figure 5:
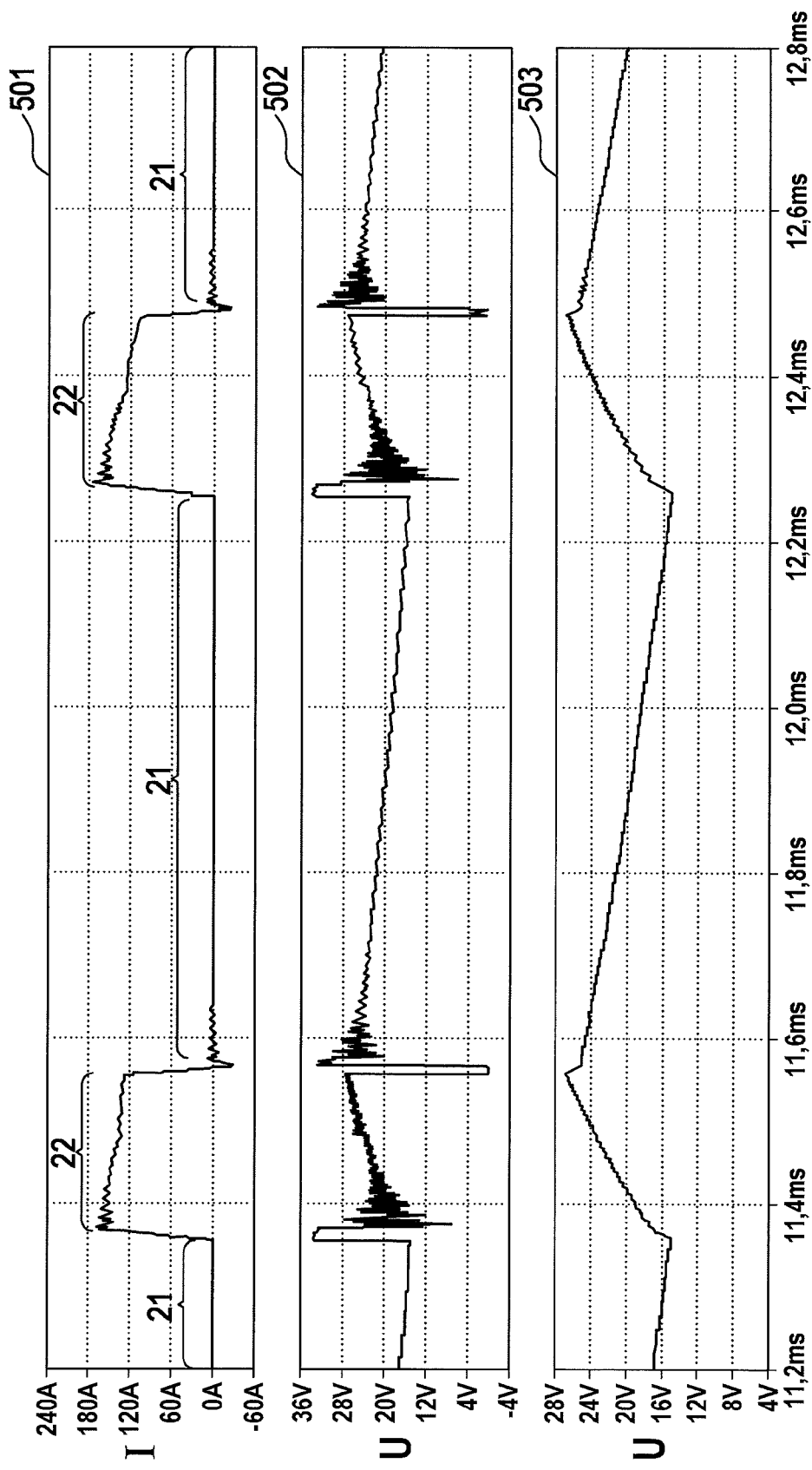
FIG. 5 shows current and voltage patterns for the control of an active bridge rectifier during load shedding, according to the related art and according to one specific embodiment of the present invention.

The effects resulting from the measures according to the present invention are depicted in FIG. 5. FIG. 5 includes diagrams 501, 502, and 503.

Diagram 501 illustrates a current I in A, plotted on the ordinate, as a function of time t in ms, plotted on the abscissa. The current pattern essentially corresponds to the current pattern also shown in FIG. 2. The corresponding phases are denoted by the same reference numerals as in FIG. 2. As previously described, there is a short circuit in phases 21, and this short circuit is eliminated in phases 22. As is apparent, a sudden rise in current results in each case during the transition from phases 21 to phases 22.

Diagram 502 shows resulting voltage patterns in a circuit according to the related art, i.e., without prevention of voltage peaks. Diagram 502 and diagram 503, explained below, in each case illustrate voltages U in V on the ordinate, as a function of time t in ms on the abscissa. As is apparent, the voltages during the transition from phases 21 to phases 22 in each case reach values of up to several V. The achievable voltage peak û is computed to be û=L×(di/dt), where i=$I_{Gen}$ (generator current) according to FIG. 2. The converse also applies for the transition from phases 22 to phases 21, which results in voltage dips.

In contrast, in diagram 503, such voltage peaks and voltage dips are significantly reduced due to the measures according to the present invention.

FIG. 6 shows the use of internal clamping elements. In other respects, the system illustrated in FIG. 6 largely corresponds to FIG. 1A and FIG. 4. Only a portion of the elements are provided with reference numerals.

In the present case, a Zener diode Z and a diode D are integrated in each case in the particular illustrated forward flow or blocking direction, parallel to active switching elements S1 through S3 of upper rectifier branch H. Zener diode Z ensures that a control line S1' through S3' is in each case supplied with a current from positive voltage terminal B+ on the direct voltage side when the voltage present there exceeds the breakdown voltage of Zener diode Z. As a result, corresponding active switching elements S1 through S3 (in addition to active switching elements S4 through S6 which are controlled for short-circuiting inputs u through w) are likewise temporarily short-circuited. Diode D ensures in each case that a current of a control signal does not flow into the vehicle electrical system during regular operation.

What is claimed is:

1. A vehicle electrical system, comprising:
   an active bridge rectifier connected to a generator via multiple phase terminals, the active bridge rectifier having terminals on a direct voltage side;
   a load shedding recognition unit which recognizes load shedding at the active bridge rectifier in response to a voltage between the terminals of the bridge rectifier on the direct voltage side rising above a first predetermined voltage threshold, and short-circuits the phase terminals during the load shedding in a clocked manner so that the active bridge rectifier provides a pulsed current including an on phase during a rectifying operation and an off phase during the load shedding;
   at least one vehicle electrical system capacitor connected to the direct voltage side of the active bridge rectifier to receive a portion of the pulsed current during the rectifying operation and provide a current to the vehicle electrical system during the load shedding; and
   a voltage limiter which clips the voltage between the terminals of the bridge rectifier on the direct voltage side in response to the voltage between the terminals of the bridge rectifier on the direct voltage side rising above a second predetermined voltage threshold during transitions between the rectifying operation and the load shedding, the second predetermined voltage threshold being greater than the first predetermined voltage threshold.

2. The vehicle electrical system as recited in claim 1, wherein the active bridge rectifier includes multiple active switching elements in a number of half bridges which correspond to the number of phase terminals, a first group of the active switching elements being controlled as a group in a clocked manner for the clocked short-circuiting of the phase terminals.

3. The vehicle electrical system as recited in claim 1, wherein the voltage limiter includes a voltage-dependent element that provides a low-resistance conductive connection from a first of the terminals of the bridge rectifier on the direct voltage side to a second of the terminals of the bridge rectifier on the direct voltage side in response to the voltage between the terminals rising above the second predetermined voltage threshold, and a high-resistance non-conductive connection from the first of the terminals to the second of the terminals in response to the voltage falling below the second predetermined voltage threshold.

4. The vehicle electrical system as recited in claim 1, wherein the voltage limiter includes at least one of a Zener diode and a varistor connected between the terminals of the bridge rectifier on the direct voltage side and having one of a breakdown voltage or a threshold voltage corresponding to the second predetermined voltage threshold.

5. The vehicle electrical system as recited in claim 1, wherein the voltage limiter includes at least one controllable switching element connected between the terminals of the bridge rectifier on the direct voltage side and which switches over from a nonconductive state into a conductive state for a predetermined time period in response to the load shedding recognition unit eliminating the short-circuiting of the phase terminals.

6. The vehicle electrical system as recited in claim 3, wherein the at least one voltage-dependent element is integrated between the terminals on the direct voltage side.

7. The vehicle electrical system as recited in claim 1, wherein the voltage limiter includes a plurality of voltage-dependent elements, each voltage-dependent element being integrated between one of the terminals of the bridge rectifier on the direct voltage side and a gate terminal of a respective one of a plurality of active switching elements of the active bridge rectifier, to provide a low-resistance conductive connection from the one of the terminals to the respective gate terminal in response to the voltage between the terminals rising above the second predetermined voltage threshold.

8. The vehicle electrical system as recited in claim 1, wherein the voltage limiter includes avalanche-resistant active switching elements of the active bridge rectifier to perform the clipping by entering into an avalanche breakdown.

9. The vehicle electrical system as recited in claim 2, wherein the voltage limiter clips the voltage between the terminals on the direct voltage side above the second voltage threshold by controlling at least one active switching element which is not part of the first group of active switching elements.

10. A method for operating a vehicle electrical system that includes an active bridge rectifier connected to a generator via multiple phase terminals and having terminals on a direct voltage side, a load shedding recognition unit, at least one vehicle electrical system capacitor, and a voltage limiter, the method comprising:
    ascertaining, by the load shedding recognition unit, an occurrence of load shedding at the active bridge rectifier in response to a voltage between the terminals of the bridge rectifier on the direct voltage side rising above a first predetermined voltage threshold;
    upon ascertaining the occurrence of load shedding at the active bridge rectifier, short-circuiting the phase terminals by the load shedding recognition unit during the load shedding in a clocked manner so that the active bridge rectifier provides a pulsed current including an on phase during a rectifying operation and an off phase during the load shedding;
    receiving by the at least one vehicle electrical system capacitor a portion of the pulsed current during the rectifying operation, and providing by the at least one vehicle electrical system capacitor a current to the vehicle electrical system during the load shedding; and
    clipping, using the voltage limiter, the voltage which is present between the terminals of the bridge rectifier on the direct voltage side in response to the voltage between the terminals of the bridge rectifier on the direct voltage side rising above a second predetermined voltage threshold during transitions between the rectifying operation and the load shedding, the second predetermined voltage threshold being greater than the first predetermined voltage threshold.

11. The method as recited in claim 10, wherein the voltage limiter includes at least one controllable switching element connected between the terminals of the bridge rectifier on the direct voltage side and configured to perform the clipping by switching from a nonconductive state into a conductive state for a predetermined time period in response to the load shedding recognition unit eliminating the short-circuiting of the phase terminals.

12. The method as recited in claim 10, wherein the active bridge rectifier includes a plurality of active switching elements in a number of half bridges which correspond to the number of phase terminals, a first group of the active switching elements being controlled as a group in a clocked manner for the clocked short-circuiting of the phase terminals.

13. The method as recited in claim 12, wherein the voltage between the terminals on the direct voltage side is clipped to the predefined maximum voltage by controlling at least one active switching element which is not part of the first group of active switching elements.

14. A non-transitory machine-readable storage medium having program instructions, which when executed by a processor perform a method for operating a vehicle electrical system, the vehicle electrical system including an active bridge rectifier connected to a generator via multiple phase terminals and having terminals on a direct voltage side, a load shedding recognition unit, at least one vehicle electrical system capacitor, and a voltage limiter, the method comprising:

ascertaining, by the load shedding recognition unit, an occurrence of load shedding at the active bridge rectifier in response to a voltage between the terminals of the bridge rectifier on the direct voltage side rising above a first predetermined voltage threshold;

upon ascertaining an occurrence of load shedding at the active bridge rectifier, short-circuiting the phase terminals by the load shedding recognition unit during the load shedding in a clocked manner so that the active bridge rectifier provides a pulsed current including an on phase during a rectifying operation and an off phase during the load shedding;

receiving by the at least one vehicle electrical system capacitor a portion of the pulsed current during the rectifying operation, and providing by the at least one vehicle electrical system capacitor a current to the vehicle electrical system during the load shedding; and clipping, using the voltage limiter, the voltage which is present between the terminals of the bridge rectifier on the direct voltage side in response to the voltage between the terminals of the bridge rectifier on the direct voltage side rising above a second predetermined voltage threshold during transitions between the rectifying operation and the load shedding, the second predetermined voltage threshold being greater than the first predetermined voltage threshold.

15. The non-transitory machine-readable storage medium as recited in claim 14, wherein the voltage limiter includes a voltage-dependent element that provides a low-resistance conductive connection from a first of the terminals of the bridge rectifier on the direct voltage side to a second of the terminals of the bridge rectifier on the direct voltage side in response to the voltage between the terminals rising above the second predetermined voltage threshold, and a high-resistance non-conductive connection from the first of the terminals to the second of the terminals in response to the voltage falling below the second predetermined voltage threshold.

16. The non-transitory machine-readable storage medium as recited in claim 14, wherein the voltage limiter includes at least one of a Zener diode and a varistor connected between the terminals of the bridge rectifier on the direct voltage side and having one of a breakdown voltage or a threshold voltage corresponding to the second predetermined voltage threshold.

17. The non-transitory machine-readable storage medium as recited in claim 14, wherein the voltage limiter includes at least one controllable switching element connected between the terminals of the bridge rectifier on the direct voltage side and which switches over from a nonconductive state into a conductive state for a predetermined time period in response to the load shedding recognition unit eliminating the short-circuiting of the phase terminals.

* * * * *